United States Patent [19]

Satoh et al.

[11] 4,224,480
[45] Sep. 23, 1980

[54] HOLOGRAPHIC PLAYBACK SYSTEM USING A CHARGE STORAGE SENSOR AND BINARY DECODING

[75] Inventors: Isao Satoh; Makoto Kato, both of Kadoma, Japan

[73] Assignee: Matsushita Electric Industrial Co., Ltd., Japan

[21] Appl. No.: 876,130

[22] Filed: Feb. 8, 1978

Related U.S. Application Data

[62] Division of Ser. No. 768,744, Feb. 15, 1977, Pat. No. 4,104,489.

[30] Foreign Application Priority Data

Feb. 18, 1976 [JP] Japan ................................. 51-17294

[51] Int. Cl.² .......................... G11B 7/12; G11B 17/00
[52] U.S. Cl. ....................... 179/100.3 G; 179/100.1 S; 179/100.3 V; 350/3.79; 365/125; 365/216
[58] Field of Search ...................... 358/128, 130, 132; 179/100.3 V, 100.3 G, 100.4 E, 100.1 S; 365/125, 216; 350/3.6, 3.61, 3.65, 3.75, 3.78, 3.79, 3.8

[56] References Cited

U.S. PATENT DOCUMENTS

| | | | |
|---|---|---|---|
| 3,848,095 | 11/1974 | Wohlmut et al. | 179/100.3 V |
| 3,891,794 | 6/1975 | Russel | 358/130 |
| 3,939,302 | 2/1976 | Kihara | 358/128 |
| 3,964,032 | 6/1976 | Bardos | 365/125 |
| 4,005,259 | 1/1977 | Kaneko | 358/128 |
| 4,021,606 | 5/1977 | Takeda et al. | 358/130 |
| 4,094,011 | 6/1978 | Nagao | 365/216 |

*Primary Examiner*—Raymond F. Cardillo, Jr.
*Attorney, Agent, or Firm*—Robert E. Burns; Emmanuel J. Lobato; Bruce L. Adams

[57] ABSTRACT

A holographic playback system comprises a turntable adapted to support a record disk which contains a series of holograms recorded along convoluted spiral tracks. Each of the holograms represents a pattern of data bits and synchronization bit, and an optical system for directing a laser beam to the record disk, whereby the laser beam is diffracted by the interference fringes of the hologram to reconstruct the image of the pattern of data and synchronization bits. The turntable is driven so that the holograms are successively shifted in location with respect to the laser beam and illuminated by the beam. A solid-state image sensor is provided which includes a plurality of charge storage type sensing elements each positioned to receive the reconstructed image of each data bit and a non-charge storage type sensing element positioned to receive the reconstructed image of the synchronization bit. The charge storage type image sensing elements is sequentially triggered to generate a series of binary signals before a subsequent hologram is shifted to the beam-illuminated position. The binary signals are then decoded into the original signal for reproduction. The speed of the turntable is controlled in accordance with the reproduced synchronization signal.

4 Claims, 22 Drawing Figures

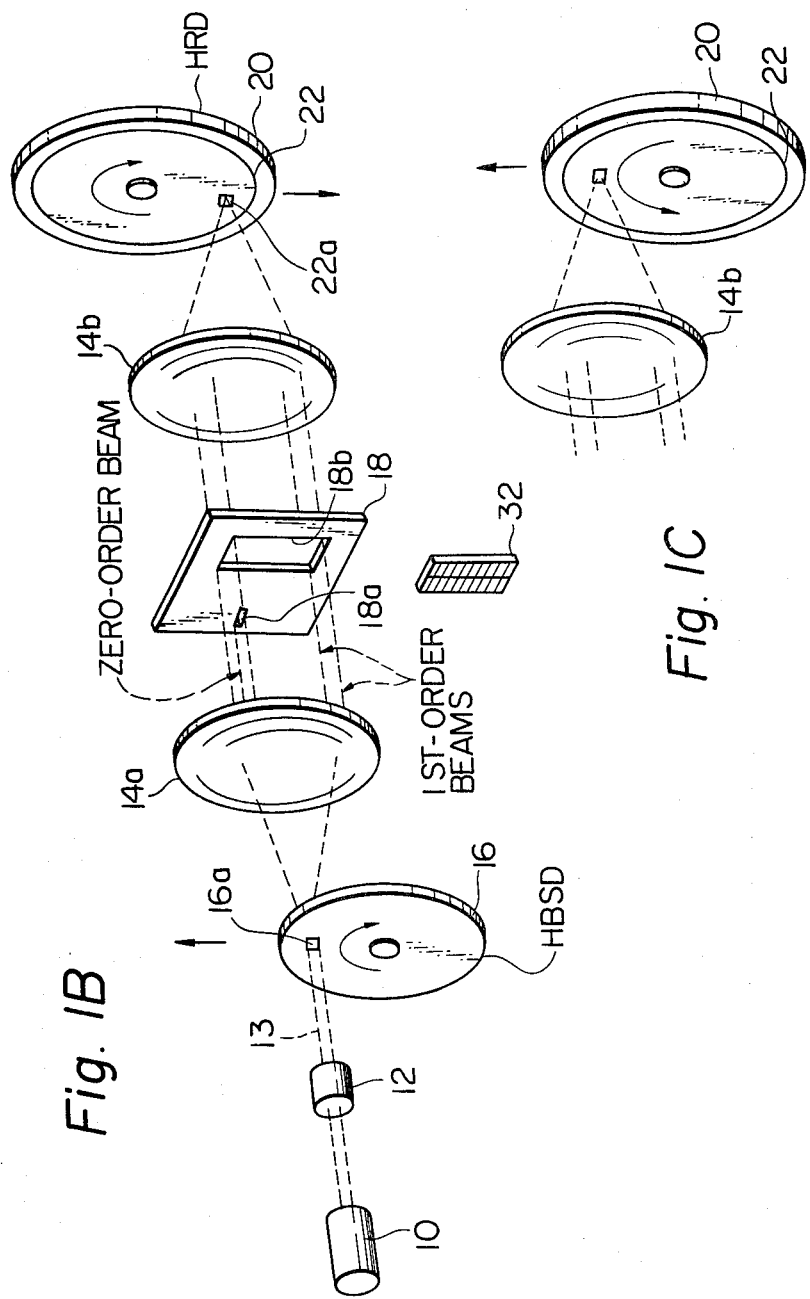

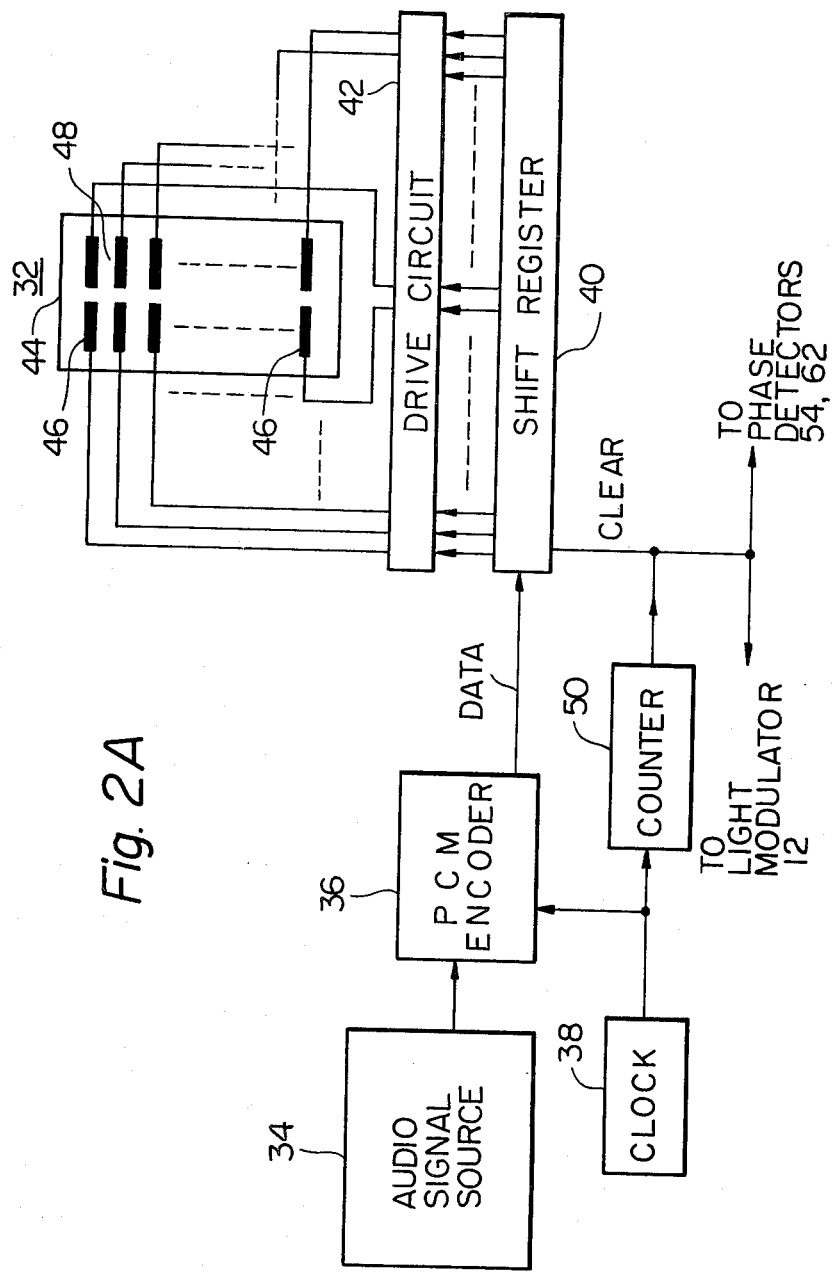

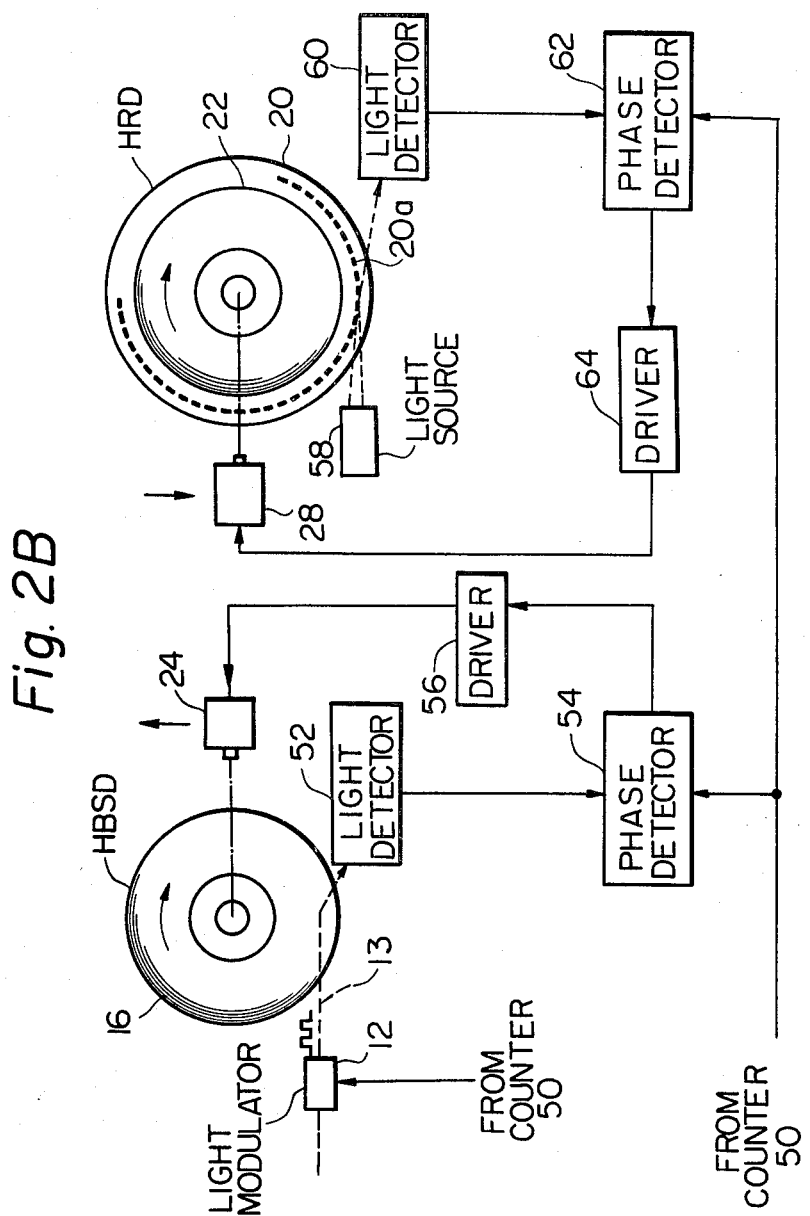

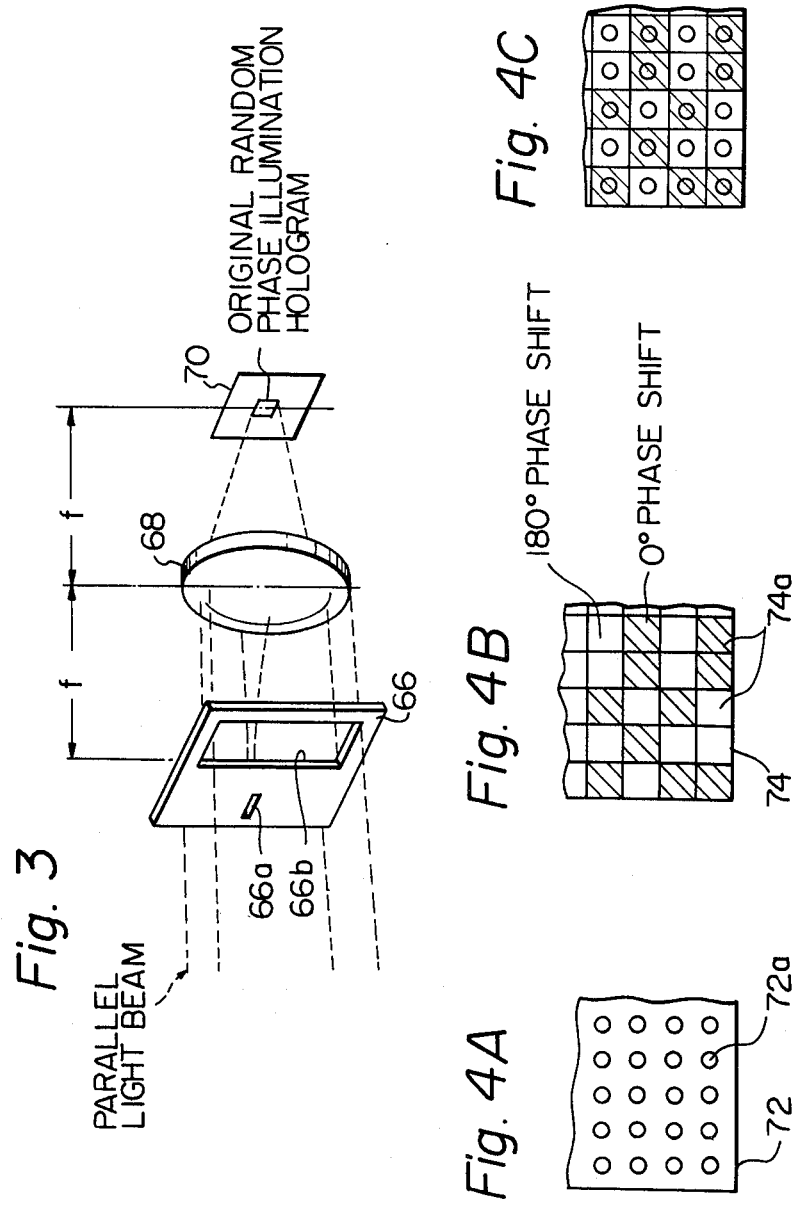

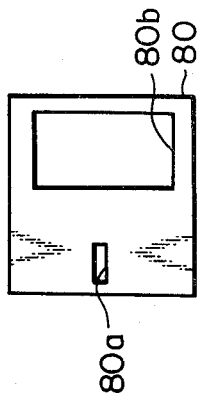
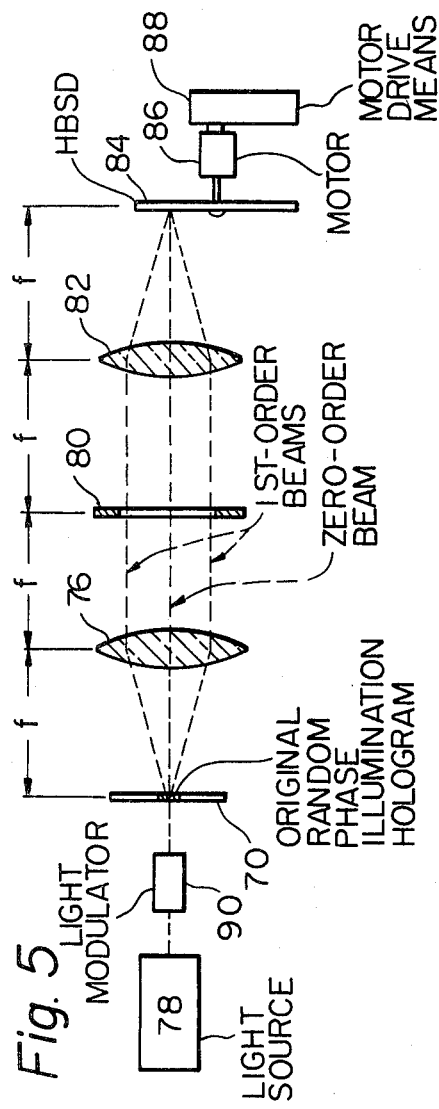

HOLOGRAPHIC PLAYBACK SYSTEM USING A CHARGE STORAGE SENSOR AND BINARY DECODING

CROSS-REFERENCE TO COPENDING APPLICATION

This application is a divisional application of copending patent application, Ser. No. 768,744 filed Feb. 15, 1977, now U.S. Pat. No. 4,104,489.

FIELD OF THE INVENTION

The present invention relates generally to holographic information recording and reproduction, and in particular to a system for reproducing an original signal from a disk record containing a series of two-dimensional holograms each of a pattern of binary signals. The present invention is particularly advantageous in respect to audio signals.

BACKGROUND OF THE INVENTION

As an alternative to the conventional mechanical groove recording, optical density recording utilizing a laser beam has been proposed to record video and/or audio information on a photosensitive disk. Since this optical recording permits the use of a non-contact type transducer during playback, the problem of impairing the quality of recorded information can be completely eliminated. To permit high quality recording of an analog signal, the signal should first be quantized and each quantized signal is encoded into a series of binary signals. One approach that has been proposed is to record such binary signals on a bit-by-bit basis. This requires that the signals be recorded on a track as wide as one micronmeter, and consequently involves the use of a costly mechanism for playback to provide high precision tracking and focusing of beam onto the desired track. Because of the narrow width track, the recorded information is less immune to the effects of dust and scratches, a problem which somewhat offsets the advantages of the optical density recording.

Fourier transform holography has been considered as a solution to such problems. To provide recording of a Fourier transform hologram binary signals are converted into a two-dimensional pattern of binary optical densities and the interference fringe pattern of such optical information is recorded as a unit hologram on a photographic medium. It is however necessary that the recording medium be substantially motionless during exposure to the incident laser beam in order to obtain interference fringes of a tolerable degree of sharpness. It has been found that distance travelled by the recording medium during the exposure must be kept below one eighth of the spacing between successive fringes of the hologram being recorded. One approach that has been proposed to meet this requirement employed one-dimensional Fourier transform holography. The one-dimensional hologram is the record of a series of laterally spaced strip-like patterns successively arranged along the track and each strip-like pattern extending across the width of the track represents the Fourier spectrum while the optical density of each strip varies with the length of the track to represent the binary information. This method of recording can be regarded as a compromise between bit-by-bit direct recording and two-dimensional hologram recording because of its resemblance to the former in terms of the time-varying component of the recorded information and its likeness in someway to the latter in terms of the formation of interference fringes. However, it falls short of the latter in terms of the redundancy of information and the tolerance in precision required for the focusing and servo mechanisms.

The concept of recording a series of two-dimensional Fourier transform holograms has been precluded by the fact that the above-mentioned requirement can only be met if an extremely long period of time is allowed for recording, using methods conventionally available.

SUMMARY OF THE INVENTION

An object of the present invention is to provide a playback system for reproducing an original signal from a disk record containing a series of holograms recorded along convoluted spiral tracks, wherein each of the holograms represents a pattern of data bits and a synchronization bit.

The present invention is thus particularly though not exclusively, concerned with a playback system for reproducing signals recorded in accordance with the system described in the aforesaid U.S. Pat. No. 4,104,489.

According to the invention, the playback system comprises a turntable adapted to support a record disk containing a series of holograms recorded along convoluted spiral tracks wherein each hologram represents a pattern of data bits and a synchronization bit; an optical system for directing a laser beam to the record disk, whereby the laser beam is diffracted by the interference fringes of the hologram to reconstruct the image of the pattern of data and synchronization bits; means for driving the turntable so that the holograms are successively shifted in location with respect to the laser beam and illuminated by the beam; a solid-state image sensor having a plurality of charge storage type sensing elements each positioned to receive the reconstructed image of each data bit, and a non-charge storage type sensing element positioned to receive the reconstructed image of the synchronization bit; means for triggering the charge storage type sensing elements sequentially to generate a series of binary signals before a subsequent hologram is shifted to the beam-illuminated position; means for decoding binary signals into the original signal; and means for controlling the speed of the turntable in accordance with the synchronization signal.

BRIEF DESCRIPTION OF THE DRAWINGS

These and other objects, features and advantages of the present invention will become understood when read in conjunction with the accompanying drawings, in which:

FIGS. 1B and 1C are perspective views of the optical section;

FIG. 2A is a schematic circuit diagram of a data input circuit of the recording system of the invention illustrating a page composer used in the optical section of FIG. 1A in enlarged scale;

FIG. 2B is a diagram illustrating servo control section of the recording system;

FIG. 3 is a perspective view of an optical arrangement with which an original random phase illumination hologram is prepared;

FIGS. 4A to 4C are illustrations in part of sampling and phase masks employed in the optical arrangement of FIG. 3;

FIG. 5 is a cross-sectional view of an optical arrangement with which the original random phase illumination hologram is reproduced in a convoluted sequence on a recording disk which serves as a holographic beam splitter of FIG. 1A.

FIG. 5A is a front view of a mask used in the arrangement of FIG. 5;

DESCRIPTION OF THE PREFERRED EMBODIMENTS

Figure 1A:
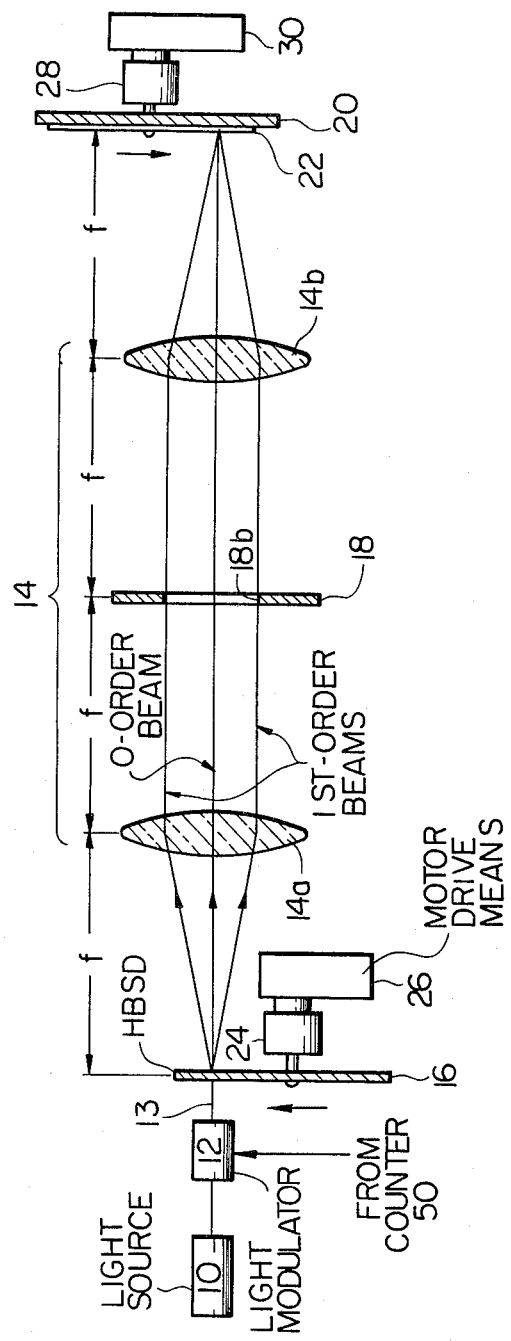
FIG. 1A is a cross-sectional view in elevation of the optical section of the holographic recording system of the invention.

In FIGS. 1 and 2, the holographic system is illustrated as generally comprising an optical section (FIGS. 1A to 1C), a data input circuit (FIG. 2A), and a servo control section (FIG. 2B). In FIGS. 1A and 1B, the optical section of the system comprises a laser beam source 10 for providing a beam of substantially monochromatic light to a light modulator 12 for modulating the intensity of the incident light into high and low brightness levels with a signal applied thereto, and a double diffraction lens system 14 comprising a pair of Fourier transforming lenses 14a and 14b. A holographic beam splitter disk 16 is disposed to receive the intensity modulated laser beam at a focal distance from the first Fourier transforming lens 14a. A mask 18 is positioned in a Fourier transform plane of the first lens 14a which is also a front focal plane of the second lens 14b. A hologram recording disk 20 coated with a photosensitive film 22 is located in a Fourier transform plane of the second lens 14b. The holographic beam splitter disk 16 and the hologram recording disk 20 are both turned clockwise at the same speed by motors 24 and 28, respectively. Motors 24 and 28 are coupled respectively to motor drive means 26 and 30 which moves the respective motors in a direction transverse to their axes of rotation in opposite directions.

Figure 6:
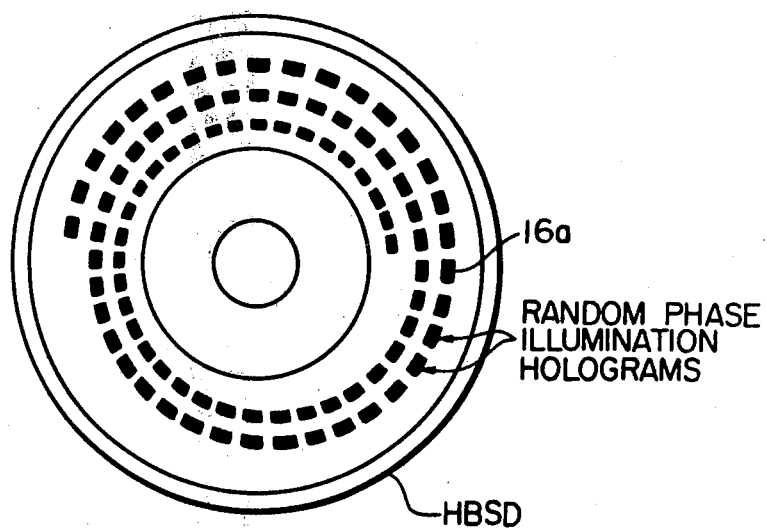
FIG. 6 is a plan view of the holographic beam splitter prepared in accordance with the arrangement of FIG. 5 illustrating a portion of random phase illumination holograms enlarged in scale.

As will be described later, the holographic beam splitter disk 16 comprises a convoluted series of identical random phase illumination holograms (Fourier transform holograms) as illustrated separately in FIG. 6. As the disk 16 is turned clockwise each random phase illumination hologram 16a is positioned in the path of intensity modulated beam 13 at its high brightness level. Each hologram 16a when positioned in the path of beam 13 will diffract the incident light into a zero-order diffracted beam and a first-order diffracted array of sampled, randomly phase shifted light beams, both beams being focused by the first Fourier transforming lens 14a onto the mask 18.

The mask 18 is provided with a first aperture or a reference aperture 18a and a second or information bearing aperture 18b in which is positioned a page composer or light modulator 32 that spatially modulates in phase the incident light by discrete amounts in accordance with a set of binary signals applied thereto.

Through the first Fourier transforming lens 14a, the zero-order beam passes through the reference aperture 18a to serve as a reference beam and the first-order beams pass through the information bearing aperture 18a. The second Fourier transforming lens 14b is aligned to receive the zero- and first-order beams to bring them to focus on the hologram recording disk 20. A hologram is formed as at 22a as a result of interference between the zero- and first order beams and a set of binary information applied to the light modulator 32 is recorded in the form of interference fringes.

In order to make a record of sharply defined interference fringes on disk 20, it is necessary that the disks 16 and 20 are both located in planes conjugate to each other and that the axes of rotation of both disks are located symmetrically opposite to each other with respect to the optical axis of the image forming lens system 14. Otherwise stated, the points of rotation of disks 16 and 20 must be conjugate to each other at all times. As seen in FIG. 1B, a clockwise rotation of disk 16 will cause the resultant interference fringes on disk 20 to drift in a direction opposite to the direction of movement of the hologram 16a on disk 16. By clockwise rotation of the disk 20 in synchronism with disk 16, it is possible to make the resultant interference fringes almost stand-still with respect to the hologram recording disk 20.

FIG. 1C depicts an alternative arrangement of that shown in FIGS. 1A and 1B. In the alternative arrangement the hologram recording disk 20 is positioned such that its axis of rotation is aligned to the axis of rotation of the holographic beam splitter disk 16 and the disk 20 is turned in counterclockwise direction and laterally moved in the same direction as the disk 16. Therefore, both disks are turned in opposite directions but moved laterally to the axes of rotation in the same direction.

In step with the application of a set of binary signals to the page composer 32, a series of holograms 22a can be recorded on disk 20 in convoluted spiral tracks from outer to inner convolutions by laterally shifting the disks 16 and 20 in appropriate directions successively by the width of a track.

In FIG. 2A, the data input section of the system comprises a signal source 34 providing, for example, audio information to a PCM encoder 36 where the signal is sampled at a rate of 50 kHz, for example, using timing signal from clock source 38 and converted into a stream of 13 bits for each sampled signal. The output of 13 bits for each sample is clocked into a shift register 40 and transferred to a drive circuit 42.

The page composer 32 comprises an electrooptical plate 44 formed of a material capable of providing birefringent effect such as PLZT or DKDP and is positioned in the second aperture 18b of mask 18 and a plurality of rectangular electrodes 46 laterally spaced on the plate 44 in two columns. An electrooptical transducing rectangular area 48 is formed in the space between adjacent electrodes to impart a phase shift of 90° to the incident light in response to the application of a potential difference between adjacent electrodes. In the illustrated embodiment, a ceramic plate of 9/65/35 PLZT polished to a thickness of 0.127 mm is employed as the electrooptical plate 44.

Figure 7:
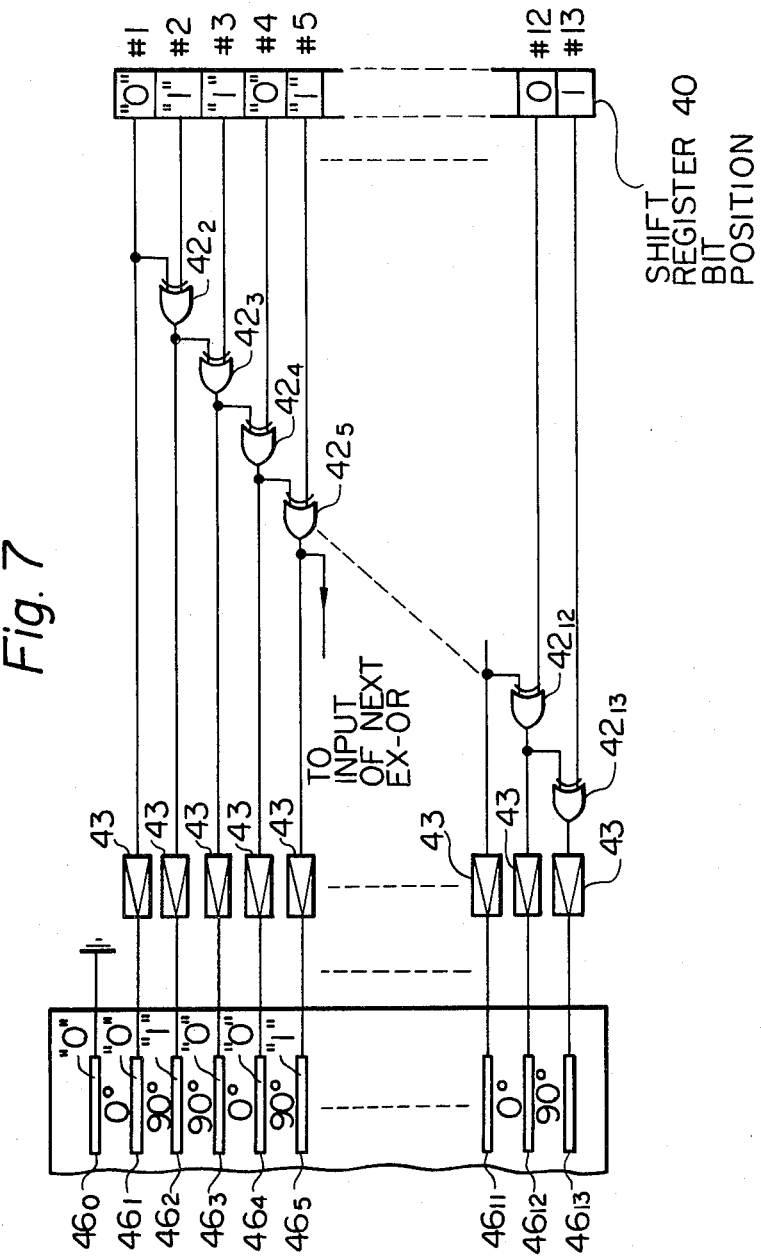
FIG. 7 is a circuit diagram of a drive circuit connected as an interface between the page composer and the data input circuit.

The composer drive circuit 42 is shown separately in FIG. 7 as comprising a plurality of two-level exclusive-OR gates identified by numerals $42_2$ to $42_{13}$ where the subscript represents the corresponding number of bit position #1 to #13 of the shift register 40 and the corresponding number of modulator electrodes $42_2$ to $42_{13}$. The first bit position of shift register is connected to the first modulator electrode $40_1$ through an amplifier 43. Each of the exclusive-OR gates $42_2$ to $42_{13}$ has its first input connected to the corresponding storage bit position and its output connected to the corresponding modulator electrode through amplifier 43. The second input of each gate is connected to the output of the adjacent gate associated with the preceding bit position except that the second input of gate $42_2$ is connected directly to the first bit position. A reference modulator electrodes $46_0$ is connected to ground to serve as a reference potential, and the first electrode $46_1$ is biased at a potential corresponding directly to the binary level of the first bit position of the shift register.

Assuming that contents of the shift register 40 are represented by a series of bits "01101 ... 01", the first electrode $46_1$ is at zero so that no potential difference exists between electrodes $46_0$ and $46_1$ and consequently the space therebetween is not electrooptically excited and imparts a zero-degree phase shift to the incident light. The gate $42_2$ provides a "1" output to the second modulator electrode $46_2$ to thereby establish a potential gradient with respect to the electrode $46_1$ so that the space therebetween is electrooptically excited to impart a phase shift of 90°. Since the output of the adjacent gate $42_2$ is "1", the gate $42_3$ places a "0" output to the third electrode $46_3$ so that a potential gradient exists relative to the preceding electrode $46_3$ so that a potential gradient exists relative to the preceding electrode $46_2$. Therefore, it will be understood that the space between adjacent ones of the modulator electrodes $46_0$ to $46_{13}$ is electrooptically made active at one of binary states depending on the binary state of the corresponding bit position of the shift register and the incident light on the light modulator 32 is spatially modulated in phase at one of zero and 90 degrees.

The information stored in the shift register 40 is cleared periodically in step with the output from a counter 50 in response to a count of 13 bits from the clock source 38.

The output from the counter 50 is also connected to the light modulator 12 to achieve synchronization between it and the disks 16 and 20 and the page composer 32.

To achieve synchronization of the system the servo control section of the system shown in FIG. 2B includes a light detector 52 disposed to pickup the light reflected from the surface of the disk 16 to feed its output to one input of a phase detector 54. To the other input of the phase detector 54 is connected the output from the counter 50 for comparison in phase with the output from the light detector 52. The minimum light level of the beam from light modulator 12 when the beam is substantially reduced in intensity is sufficient for the light detector 52 to provide its output, but lower than the light sensitive level of the hologram recording disk 20, so that the beam at the reduced light level is substantially reflected from the portions of the disk 16 where the illumination hologram are not recorded and picked up by the detector 52. The output from detector 52 thus represents the track speed of the disk 16.

The output from the phase detector 54 thus represents the deviation of the shifting speed of such hologram from the reference speed set by the timing signal from the counter 50, and is applied to the motor 24 through driver 56 so that the light modulator 12 is synchronized with the speed of the motor 24 to illuminate each hologram 16a with the pulsed beam 13.

The hologram recording disk 20 is also in synchronism with the disk 16. To achieve this, a light source 58 is provided to illuminate the periphery of the turnable 20 where a circle of equally spaced patterns 20a is constantly illuminated by the beam from the source 58. A light detector 60 is disposed to receive the light reflected from the pattern 20a to convert it into electrical pulses which are in turn fed into a phase detector 62 for comparison with the output from the counter 50. The detector 62 output is fed into the motor 28 through driver 64 so that the disk 20 is turned in synchronism both with the shifting of each illumination hologram and with the application of each set of binary signals to the light modulator 32.

In order to make full understanding reference is then had to FIGS. 3 and 4 in which is shown an arrangement for preparing an original random phase illumination hologram and then to FIG. 5 in which is shown an arrangement for preparing the holographic beam splitter disk 16 using the original random phase illumination hologram.

In FIG. 3, a mask 66 having a first aperture 66a and a second aperture 66b is positioned to receive a parallel coherent light beam. The first and second apertures of the mask 66 have the same dimensions as the dimensions of the first and second apertures 18a and 18b of mask 18, respectively. The beams passing through the apertures 66a and 66b are brought to a focus by a Fourier transforming lens 68 on a Fourier transform plane 70 on which a photographic recording film is disposed. In the second aperture 66b is positioned a sampling mask 72 and a random phase shift mask 74 superimposed on the sampling mask 72. In FIG. 4A, sampling mask 72 is partly shown as comprising an opaque material having a regular array of transparent areas or apertures 72a. A portion of the phase mask 74 is shown in FIG. 4B as comprising a light transmitting material having discretely varying depression 74a randomly arranged to impart a phase shift of 180° (white areas) to the light incident on it, with the remaining areas (shaded areas) imparting a phase shift of 0°. The sampling and phase masks are aligned such that each of the transparent areas of the former falls completely within one discrete phase shifting area of the latter. As shown in FIG. 4C, the combination of the two masks looks like a new mask where the light transmitted through half the transparent areas undergoes a phase shift of 180° while the light transmitted through the remaining areas undergoes a zero phase shift. The combination of these masks is placed in aperture 66b in the front focal plane of the Fourier transforming lens 68 and is illuminated with the coherent light beam, so that the beam passing therethrough is an array of sampled, randomly phase-shifted beams of light. The coherent light beam passing through the first aperture 66a serves as a reference beam so that a hologram is formed on the Fourier transform plane 70. It will be understood that the hologram thus produced is of Fourier transform type, and it is the Fourier transform hologram that is arranged in sequence in the holographic beam splitter disk 16.

The use of such illumination holograms as a beam splitter is advantageous in that coherence requirement (monochromaticity and spatial dispersion) of the light incident thereon is considerably eased as fully described in U.S. Pat. No. 3,917,380 issued to Makoto Kato et al. assigned to the same assignee of the present invention.

The original random phase illumination, or Fourier transform hologram 70 is located at a front focal plane of a Fourier transforming lens 76 as shown in FIG. 5 and subject to illumination of a substantially monochromatic light beam from a source 78. A mask 80, separately shown in FIG. 5A, is positioned in the rear focal plane of the lens 76 which is also a front focal plane of a second Fourier transforming lens 82. The mask 80 is provided with first and second apertures 80a and 80b having equal dimensions to the first and second apertures respectively of the mask 66 employed in the record of the original Fourier transform hologram in connection with FIG. 3. A hologram disk 84 is positioned in the rear focal plane of the second lens 82 and is driven by a motor 86 which is in turn carried on a suitable moving means 88 to move the disk 84 in a direction transverse to the axis of rotation of the disk 84 as indicated by the arrow in FIG. 5. A light modulator or shutter 90 is disposed to interrupt the passage of beam from source 78 periodically in synchronism with the speed of the motor 86.

Since the original hologram 70 is a record of the interference fringe pattern of the combination of sampling mask 72 and phase mask 74 (FIG. 4C), the first-order diffracted beams from the hologram 70 are the reconstructed image of the combination sampling and phase masks and are focused on the second aperture 80b of mask 80 in the rear focal plane of the lens 76 and then focused on the rear focal plane of the second lens 82 in which the recording medium 84 is placed. The zero-order diffracted beam passes through the first aperture 80a of mask 80 and is focused on the recording medium 80 to produce a replica of the original hologram 70. Many of such replicas of the original hologram are recorded in convoluted spiral tracks as shown in a rather exaggerated illustration of FIG. 6 which has been referred to previously in connection with the embodiment of FIG. 1.

Therefore it will be understood that by placement of the hologram recorded disc thus produced in the position of the holographic beam splitter 16 of FIG. 1 the electrooptical transducer 32 is illuminated by the reconstructed image of the combination of phase mask and sampling mask as previously described. This permits the record of a highly redundant hologram on disk 20.

The phase mask 74 of FIG. 4B may be replaced to advantage with a pseudo-random phase mask as disclosed by Makoto Kato in U.S. Pat. No. 4,037,918. As there disclosed the pseudo-random phase mask comprises an array of approximately equal number of phase shifting squares for each one of m360°/N phase shifts where "m" is an integer ranging from unity to N and N is the number of phase shifts including zero phase shift. The phase shifting areas are arranged in a pattern of rows and columns such that the difference in phase shift between orthogonally adjacent areas or squares is 360°/N. Therefore, if N=4, the phase difference between orthogonally adjacent areas is 90°. The use of pseudo-random phase mask in combination with the sampling mask 72 allows the elimination of objectionable coherent noise.

Figure 8:
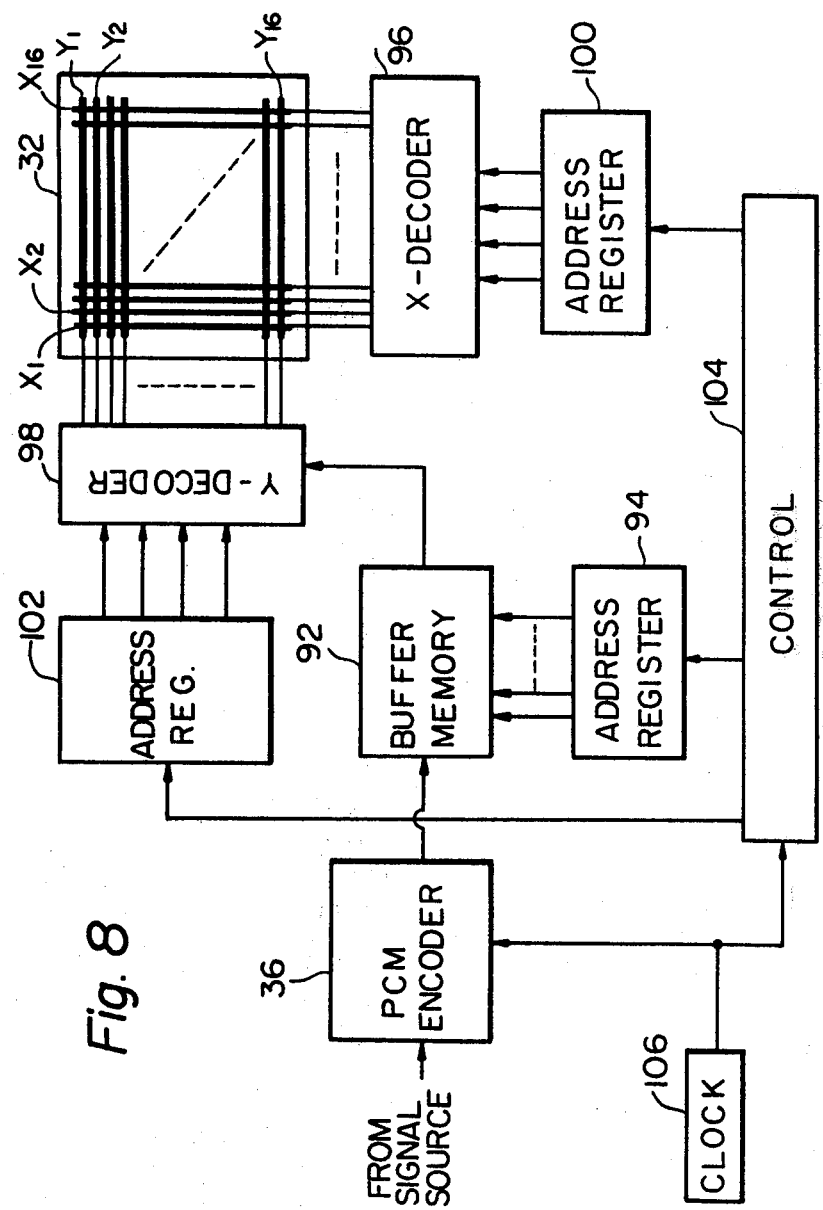
FIG. 8 is a circuit block diagram of another embodiment of the data input circuit of the recording system.

Information storage density of each final hologram can be increased by arranging the electrodes of the light modulator 32 in a pattern of rows and columns using a buffer memory for storing the binary encoded signals. FIG. 8 illustrates an embodiment for the purpose of increasing the storage capacity of the hologram recording disk. In FIG. 8 the PCM signals are stored as a group of 256 bits in a specified storage location of a buffer memory 92 which is addressed by an address register 94 and transferred to a Y-decoder 98. An X-decoder 96 is provided to successively apply an enabling potential to its output leads. The decoders 96 and 98 may be of the type SN-74154 manufactured by Texas Instruments. The X- and Y-decoders are addressed respectively by address registers 100 and 102. A control circuit 104 receives clock pulses from its source 106 to generate control signals for the address register 94, 100 and 102.

Figure 9:
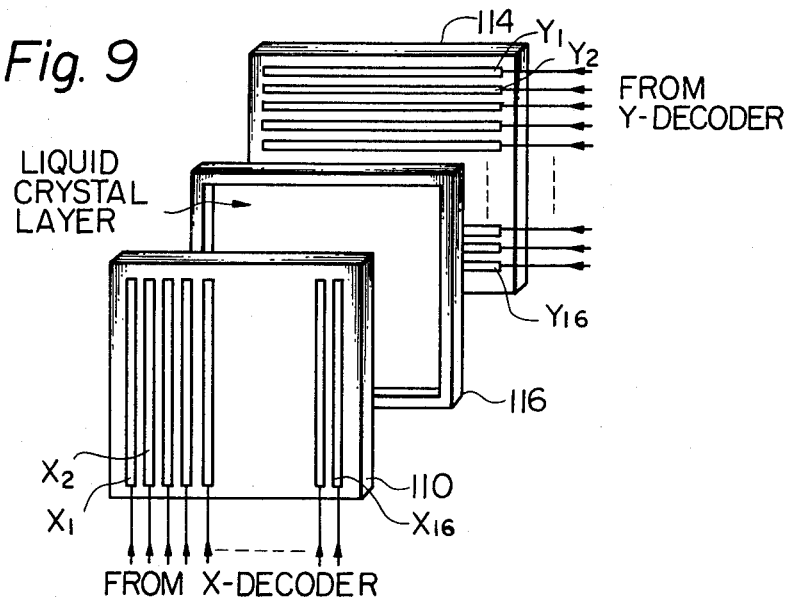
FIG. 9 is an exploded view of the page composer employed in the circuit of FIG. 8.

The light modulator 32 comprises a matrix of electrodes arranged in a pattern of rows and columns as separately illustrated in FIG. 9. In FIG. 9, column electrodes $X_1$ to $X_{16}$ are connected to the output leads of the X-decoder 96 and arranged on a light transmitting substrate 110 by vacuum vapor deposition method. Similarly, row electrodes $Y_1$ to $Y_{16}$ are connected to the output leads of the Y-decoder 98 and arranged on a light transmitting substrate 114. The electrodes 108 and 112 are made of light transmissive conductive material and arranged to intersect each other. The substrates 110 and 114 are assembled together with a framed structure or Mylar spacer 116 held therebetween to define an air tight space. In the air tight space lies a layer of nematic liquid crystals, so that the portion of the liquid crystal layer where an electrical field is established is excited to impart a phase shift of 90° to the incident light. The X- and Y-decoders are designed to apply one of binary potentials to its output leads in sequence under the control of the timing signals from the control circuit 104 such that while a column electrode $X_1$ is enabled or biased at a binary potential "1", the Y-decoder 98 is addressed to apply binary potentials ("1" and "0") transferred from the buffer memory 92 in sequence to the row electrodes $Y_1$ to $Y_{16}$ so that the portions of the crystal layer along the electrode $X_1$ where X and Y potentials coincide are excited to impart a phase shift of 90° to the incident light and remains excited for a length of time determined by the characteristic decay time of the liquid crystal. The X-decoder 96 is addressed to successively shift its enabling potential to adjacent electrodes and the above process is repeated until electrode $X_{16}$ is reached. Therefore, it is necessary that the liquid crystal be capable of staying in the excited state to hold the stored information until a total of 256 bits of information is delivered from the Y-decoder 98. Otherwise stated, the number of bits stored on light modulator 32 depends on the decay time of the liquid crystal.

The hologram recording disk 20 is coated with photoresist which, after recording is completed, will be chemically etched to form a relief. The hologram relief is then used as a master disk for copying the recorded material into polyvinyl sheets by stamping for mass production.

Figure 10:
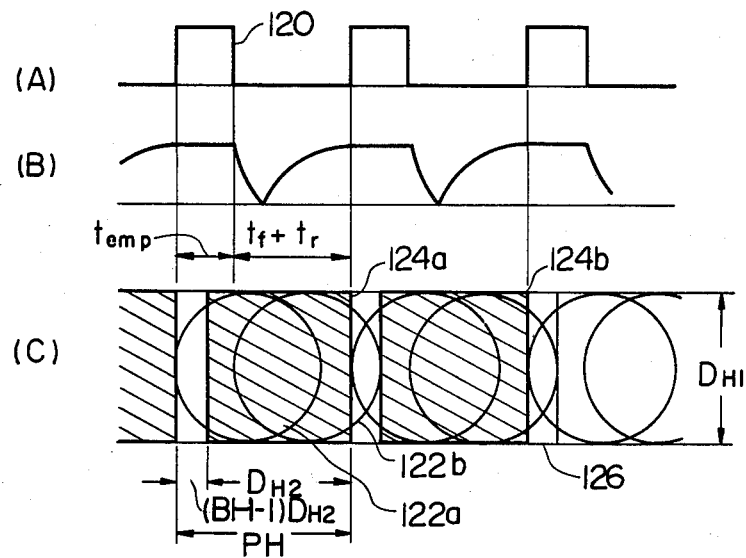
FIG. 10, including A–C, is an illustration useful for describing the operation of a light modulator in relation with the switching performance of the page composer.

To evaluate the system in terms of time required to record an audio signal equivalent to the conventional 4-channel 30 cm-diameter stereo record, reference is now made to FIG. 10 in which the waveform of the pulses applied to the light modulator 12 is shown (FIG. 10A) in relation to the switching performance of the electrooptical transducers of the modulator 32 (FIG. 10B) in response to the applied binary signals and to the area of each random phase illumination hologram on the disk 16 (FIG. 10C).

The light modulator 12 is synchronized to emit a light pulse 120 when the electrooptical transducer is switched completely to the stable state during the exposure time designated by "$t_{exp}$". The beam incident on the holographic beam splitter 16 is shown as a circle 122 and and each hologram on disk 16 is depicted as a series of squares arranged on a track 126, each being indicated by shaded area 124 having dimensions of $DH_1 \times DH_2$, where $DH_1$ represents the width of the track and $DH_1$ represents the width of each hologram. The holograms 124 are spaced at an interval of $(\beta H - 1) DH_2$ (in this example $\beta H = 1.25$). The hologram 124a is exposed to the light beam shown as a circle 122a at the instant corresponding to the leading edge of the light pulse 120 and the beam continues to illuminate it until at the trailing edge of the light pulse 120 where the light beam terminates in a position as indicated by a circle 122b.

The electrooptical transducer 32 is allowed to switch off and on during the time interval "$t_f + t_r$" indicating respectively the fall and rise times. Therefore, the time taken to record a single final hologram on the hologram recording disk 20 is given by $$t_{Rec} = t_{exp} + t_r + t_f \tag{1}$$

$$PH = \beta H \cdot DH_2 \tag{2}$$

where, PH is the interval between the trailing edge of a previous hologram and the trailing edge of the hologram of interest. The speed of rotation (rpm) of the disk 16 as well as disk 20 is expressed by $$N \leq \frac{60}{t_{Rec}} \frac{2\beta H \cdot DH_2}{\pi d_1} \tag{3}$$

where, $d_1$ is the diameter of the outermost track. The exposure time "$t_{exp}$" is also given by the following equation:

$$t_{exp} = \frac{DH_1 \cdot DH_2 \, Em}{\eta_{01} \cdot P} \tag{4}$$

where, Em is a coefficient determined by the photosensitivity of the material used as the hologram recording disk 20, $\eta_{01}$ represents the optical efficiency of the image forming system 14, and P is the laser output. If it is assumed that photoresist AZ 1350 is used as the photographic material, the suitable values for Em=24 mJ/cm$^2$ and $\eta_{01}$=0.10. If P=75 mW and $d_1$=290 mm, then the exposure time $t_{exp}$ is 320 microseconds. Assuming the time interval $(t_f + t_r)$ be 1.5 milliseconds, the time $(t_{Rec})$ needed to record a single final hologram on the disk 20 will be approximately 2 milliseconds, so that N will be 8.23 rpm.

The time required to record the entire sequence of holograms is given by $$T_{Rec} = \frac{d_1 - d_2}{2\beta T \, DH_1} \cdot \frac{1}{N} \tag{5}$$

where, $d_2$ is the diameter of the innermost track, $\beta T \, DH_1$ is the pitch with which the record tracks are laterally spaced.

Assuming that $\beta T = 1.10$, $d_2 = d_1/2$, then $T_{Rec}$ will be approximately a practical value of 1.2 hours. Furthermore, applicants' experiments showed that the permissible value of flutter is 0.18%.

Figure 11:
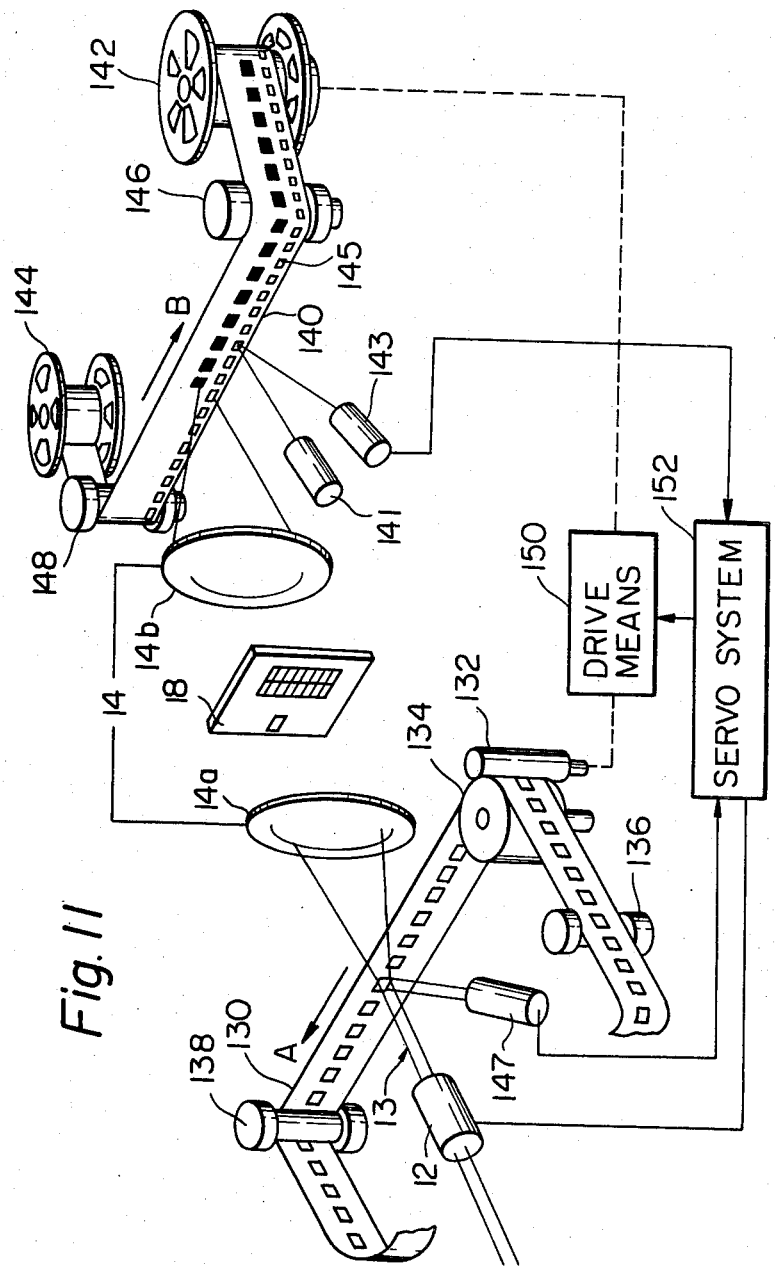
FIG. 11 is a perspective view of another embodiment of the recording system.

FIG. 11 illustrates another embodiment of the invention in which, instead of using disks for the record of both Fourier transform illumination holograms and final holograms, photographic recording tapes are employed such as used in motion picture films. Therefore, this embodiment is particularly useful for motion-picture sound track recording. As illustrated, a series of random phase illumination hologram as described previously is recorded in advance along the length of an endless-tape photographic film 130 which is transported by engagement between a capstan 132 and a roller 134 through guide posts 136 and 138 in endless fashion. A hologram recording tape 140 is coiled at respective ends around a takeup reel 142 and a supply reel 144 and supported between guide posts 146 and 148 so that the elongate section of the film 140 between guides 146 and 148 are parallel with the elongate section of the beam splitter tape 130. The capstan 132 and takeup reel 142 are both driven by a suitable drive means 150 such that the elongate sections of both film tapes are transported in opposite directions as indicated by the arrows A and B at the same speed in synchronism with a speed control signal delivered from the servo system 152 in a manner identical so that described previously in connection with FIG. 2B. A servo control signal from the recording film is generated by impinging a light beam from a light source 141 onto a series of perforations 145 provided on the edge of the film 140 and sensing the reflected light by means of a light detector 143, and another control signal is obtained from a detector 147 positioned adjacent to the beam splitter tape 130. Between the elongate sections of both tapes is provided the image forming lens system 14 as described previously and mask 18 at position identical to that described with reference to FIG. 1A. The present embodiment is also suitable for recording a large number of data in the form of hologram as compared to the disk system.

Figure 12:
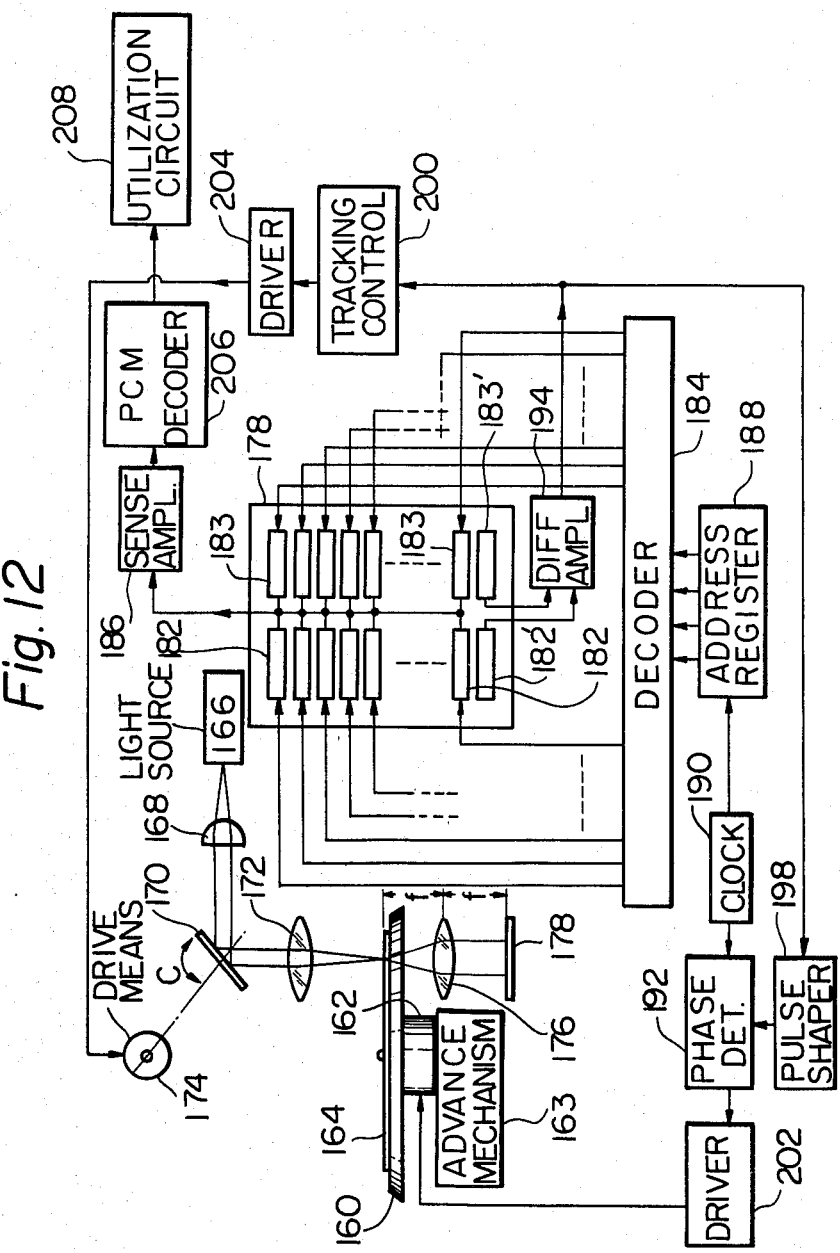
FIG. 12 is a diagrammatic illustration of an embodiment of the hologram playback system of the invention for reproducing the holograms as recorded in the system of the preceding Figures.

In FIG. 12 there is shown a holographic playback system embodying the present invention to reproduce the original signal recorded in the form of a series of two-dimensional holograms.

Figure 13:
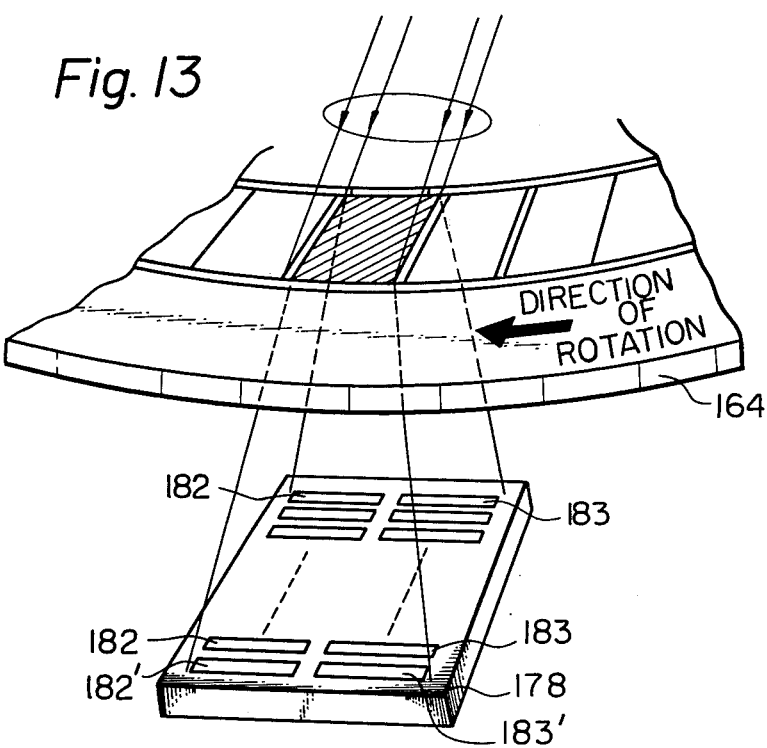
FIG. 13 is a perspective illustration of a part of hologram recording disk and an image sensor used in the embodiment of FIG. 12.

The playback system comprises a turntable 160 (formed of a transparent plastic material) mounted on the drive shaft of a motor 162 for rotation therewith to carry thereon a record disk 164 which has been prepared in accordance with the procedure previously described, a portion of the hologram recorded disk 164 being separately illustrated in FIG. 13. A light beam is emanated from a laser beam source 166, shaped into a beam of rectangular cross-section by means of a cylindrical lens 168, deflected by a tracking mirror 170 and brought to a focus on the surface of the disk 164 by a collimating lens 172. The mirror 170 is pivoted laterally to a shaft of a suitable drive means or tracking mechanism 174 so that it turns on its pivot in directions as indicated by the arrow C to change the deflection angle of the laser beam. The collimating lens 172 is located at equal distances from the mirror 170 and disk 164 in its focal plane so that the light deflected by the tracking mirror 170 is formed into a parallel light beam and made to be incident on a desired track on the disk 164. The motor 162 is suitably mounted on a turntable-advance mechanism 163 which advances the turntable 160 so that the point of incidence is shifted successively from outer to inner tracks as the turntable rotates.

The light incident on the record track is diffracted by the interference fringe pattern recorded therein and focussed by a Fourier transforming lens 176 onto a solid-state image sensor 178 located below the turntable 160 to receive a reconstructed image of the original bit pattern as illustrated clearly in FIG. 13. Since each hologram on disk 164 is the interference fringes pattern of the bit pattern on the page composer 32, each sensing area of the image sensor 178 is so arranged to correspond to each information bit contained in the hologram. The incident light beam 180 is so shaped as to illuminate each of the holograms at a predetermined angle of incidence as illustrated.

Figure 14:
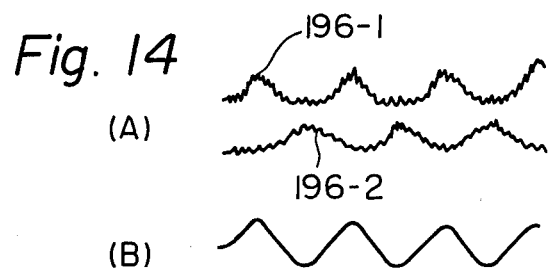
FIG. 14, including A–B, illustrates waveforms of synchronization signals generated from the image sensor.

The image sensor 178 comprises a charge-coupled device (CCD) or a bucket-brigade device (BBD) or a self-scanned type MOS image sensor and includes an array of light sensitive areas 182 and 183 arranged in two columns and capable of storing carriers in response to the incident light for a duration proportional to its characteristic decay time. The sensors of this type have their input leads respectively connected to the output of a decoder 184 which is identical in operation to those described previously. The output of the sensors 182 and 183 are connected together to a sense amplifier 186. A pair of photosensors 182' and 183' of non-charge storage type is provided on the image sensor 178 each arranged in a respective column of the charge-storage type sensors 182 and 183. As the disk 164 is turned in the direction as indicated by the arrow in FIG. 13, all the sensors are illuminated by the beam 180 and the optical energy is converted into corresponding electrical energy in the form of carriers in each sensor and stored therein. The decoder 184 is then signalled by an address register 188 to cause the information bearing sensors 182 and 183 to deliver their outputs in sequence to the sense amplifier 186 during the interval when the beam 180 is being shifted to the next hologram. Therefore, the address register 188 is timed with a train of clock pulses from a clock pulse generator 190 which also supplies its clock signal to a phase detector 192 for comparison with a synchronization signal. This synchronization signal is obtained from the output of a differential amplifier 194 which receives its input signal from the non-storage type sensors 182' and 183' on its respective input terminals. These sensors, when excited by the impinging light beam 180, produce pulses 196-1 and 196-2 as illustrated in FIG. 14A in succession. Therefore, the differential amplifier 194 receives a train of such pulses 196-1 on its one input and a train of pulses 196-2 on the other input and generates a differential output whose waveform is shown in FIG. 14B. The differential amplification of input signals from the sensor 182' and 183' can effectively reduce the noise introduced by pulsating signals from the digital circuitry. The differential output is coupled to the phase detector 192 through a pulse shaping circuit 198 and also to a tracking control circuit 200.

A signal representing the difference in phase between the synchronization signal and the clock signal is amplified by driver 202 and supplied to the motor 162.

In the tracking control circuit 200, the received synchronization is processed to generate a signal which is amplified by driver 204 and supplied to the drive means 174 so that the beam position is controlled within the desired track.

The sense amplifier 186 delivers its output to a PCM decoder 206 where the signal is converted into the original analog signal and fed into a utilization 208 such as stereo equipment.

Figure 15:
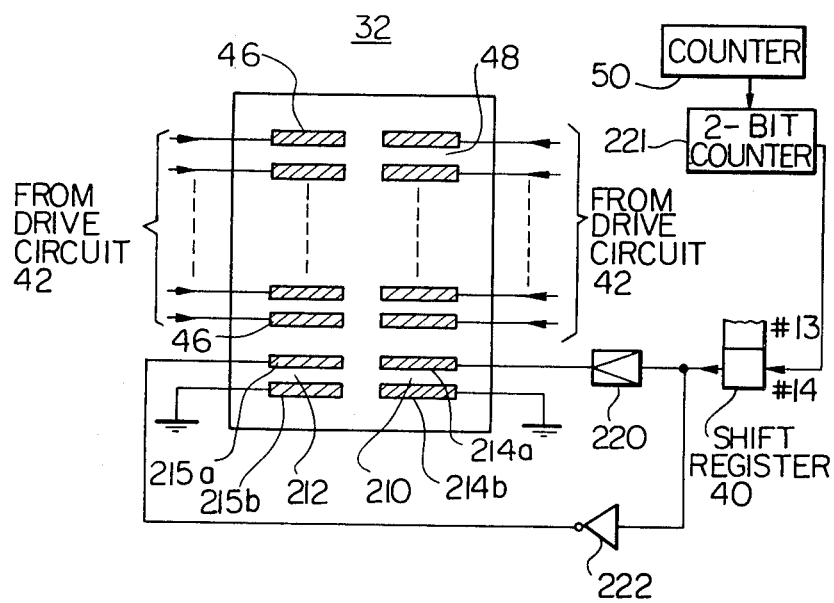
FIG. 15 is an illustration of a modified form of the page composer of FIG. 2A.

As referred to above, the synchronization signal is obtained from the two non-storage type sensors 182' and 183' which are disposed to receive the light beam diffracted from the respective holograms in which are recorded the corresponding information bearing areas of the electrooptical transducer 32. Therefore, it is necessary to assign a portion of electrooptical phase modulating areas to the function of synchronization. FIG. 15 illustrates the light modulator 32 of FIG. 2A modified to incorporate such phase modulating areas as indicated by numerals 210 and 212 defined respectively by a pair of electrodes 214 and a pair of electrodes 215. Electrode 214a is energized by a potential supplied through an amplifier 220 from the 14th bit position of the shift register 40 which has been referred to previously, and electrode 215a is biased at the opposite potential. A two-bit counter 221 is connected to the output of counter 50 which has also been referred to in connection with FIG. 2A to generate 1 or 0 output alternately with the counter output. The output of the two-bit counter 221 is supplied to the 14th bit position of the shift register so that its binary content varies alternately with successive holograms. The binary content of the 14th bit position is inverted by an inverter 222 and applied to the electrode 215a. The electrodes 214b and 215b are connected to ground so that electrical fields are established in the phase shifting areas 210 and 212 respectively depending upon the potential applied to the counter electrodes. When "1" bit is placed in the 14th bit position, the phase modulating area 210 is excited to impart a phase shift of 90° while phase modulating area 212 is not excited. Therefore, it will be understood that phase modulating areas 210 and 212 are oppositely excited at alternate intervals with successive holograms. Therefore, when a given hologram is being illuminated the image sensing area 182' is excited to generate the pulse 196-1 (FIG. 14) while no output is delivered from image sensing area 183', and the subsequent hologram, when illuminated, will cause the pulse 196-2 to be generated from phase shifting area 183', and so on. The output from the differential amplifier 194 varies in amplitude at alternate intervals with successive holograms.

Figure 16:
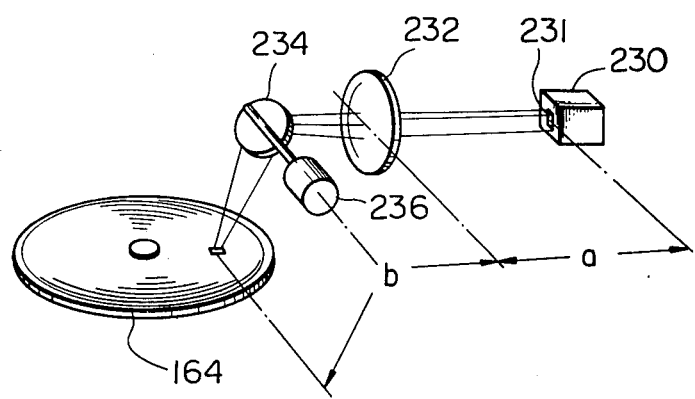
FIG. 16 is a schematic illustration of a modified form of the optical system employed in the embodiment of FIG. 12.

FIG. 16 illustrates a modification of FIG. 12 in which the laser beam source is shown as comprising a solid-state laser emitting device 230 with its beam emitting active layer 231 being vertically oriented. The narrow thin beam of light is focussed by an image forming lens 232 onto the surface of the record 164 through a deflected path provided by a tracking mirror 234 driven by a drive means 236. If the distance "a" between the laser emitting device 230 and the lens 232 and the distance "b" between the lens 230 and the record surface through the deflected path are suitably chosen, the beam is sharply focused onto the record 164 without the need of having the lens 172 as employed in the embodiment of FIG. 12. The use of such solid-state laser is advantageous because of its compactness, high efficiency and high output power available at a relatively low cost.

With the embodiment of FIG. 12, the turntable 160 is turned at a speed of 36 rpm using the image sensor 178 with a sensitivity of 10 pJ/bit and a laser output of 1.9 mW, and a playing time of two hours can be obtained.

The foregoing description shows only preferred embodiments of the present invention. Various modifications are apparent to those skilled in the art without departing from the scope of the present invention. For example, the hologram beam splitter disk 16 can also be prepared by using the technique of Fast Fourier Transform to generate interference fringe pattern of sampled, randomly phase-shifted light beams, and recording the interference fringes with the use of the electron beam recording method as employed in the process of the electron beam micro-fabrication. Therefore, the embodiment shown and described are only illustrative, not restrictive.

What is claimed is:

1. A playback system for reproducing an original signal from a disk record containing a series of holograms recorded along convoluted tracks, wherein each of said holograms represents a pattern of data bits and a synchronization bit, comprising:

a turntable adapted to support said record disk;

an optical system for directing a laser beam to said record disk, whereby the laser beam is diffracted by the interference fringes of said hologram to reconstruct the image of said pattern of data and synchronization bits;

means for driving said turntable so that said holograms are successively shifted in location with respect to said laser beam and illuminated by said beam;

a solid-state image sensor having a plurality of charge storage type sensing elements each positioned to receive the reconstructed image of each data bit, and a non-charge storage type sensing element positioned to receive the reconstructed image of said synchronization bit;

means for triggering said charge storage type sensing elements sequentially to generate a series of binary signals before a subsequent hologram is shifted to the beam-illuminated position;

means for decoding said binary signals into said original signal; and means for controlling the speed of said turntable in accordance with said synchronization signal.

2. A playback system as claimed in claim 1, wherein said speed controlling means comprises a phase detector for comparing in phase said synchronization signal and a reference timing signal.

3. A playback system as claimed in claim 1, further comprising means receptive of said synchronization signal for varying the illuminated position of said laser beam laterally to the direction of movement of said track in accordance with said synchronization signals.

4. A playback system as claimed in claim 1, wherein said optical system comprises a solid-state laser source for emitting a narrow beam of rectangular cross-section.

* * * * *